United States Patent
Rudenick et al.

(10) Patent No.: US 11,656,413 B2
(45) Date of Patent: May 23, 2023

(54) FIBER OPTIC CABLE SLACK MANAGEMENT MODULE

(71) Applicant: CommScope Technologies LLC, Hickory, NC (US)

(72) Inventors: Paula Rudenick, Jordan, MN (US); Brent Campbell, Minneapolis, MN (US); James J. Solheid, Lakeville, MN (US); Duane R. Sand, Annandale, MN (US)

(73) Assignee: CommScope Technologies LLC, Hickory, NC (US)

( * ) Notice: Subject to any disclaimer, the term of this patent is extended or adjusted under 35 U.S.C. 154(b) by 293 days.

(21) Appl. No.: 17/084,231

(22) Filed: Oct. 29, 2020

(65) Prior Publication Data

US 2021/0103105 A1    Apr. 8, 2021

Related U.S. Application Data

(63) Continuation of application No. 16/352,267, filed on Mar. 13, 2019, now Pat. No. 10,830,959, which is a
(Continued)

(51) Int. Cl.
*G02B 6/00* (2006.01)
*G02B 6/38* (2006.01)
(Continued)

(52) U.S. Cl.
CPC ......... *G02B 6/3825* (2013.01); *G02B 6/3874* (2013.01); *G02B 6/3893* (2013.01);
(Continued)

(58) Field of Classification Search
CPC .. G02B 6/3897; G02B 6/4452; G02B 6/4457; G02B 6/4453; G02B 6/4446; G02B 6/3825; G02B 6/444; G02B 6/3893
(Continued)

(56) References Cited

U.S. PATENT DOCUMENTS 2,805,106 A    9/1957 Penkala
2,864,656 A    12/1958 Yorinks
(Continued)

FOREIGN PATENT DOCUMENTS

AU    40995/85 A    4/1985
AU    55314/86 A    3/1986
(Continued)

OTHER PUBLICATIONS

International Search Report and Written Opinion of the International Searching Authority for corresponding International Patent Application No. PCT/US2015/064345 dated Apr. 4, 2016, 10 pgs.
(Continued)

*Primary Examiner* — Kaveh C Kianni
*Assistant Examiner* — Hung Q Lam
(74) *Attorney, Agent, or Firm* — Merchant & Gould P.C.

(57) ABSTRACT

A fiber optic cable slack management module includes a base defining a first cable management spool, an outer face of which is configured to contact cables when cables are pulled away from the base and a second cable management spool, within which the first cable management spool is located. An inner face of the second cable management spool is configured to contact cables when cables are in a relaxed, non-pulled state. The fiber optic cable slack management module defines a cable exit adjacent the first cable management spool and defined at least partially by the inner face of the second cable management spool, the cable exit defined by a channel positioned between the first and second cable management spools.

17 Claims, 17 Drawing Sheets

Related U.S. Application Data continuation of application No. 15/533,837, filed as application No. PCT/US2015/064345 on Dec. 7, 2015, now Pat. No. 10,247,886.

(60) Provisional application No. 62/090,203, filed on Dec. 10, 2014.

(51) Int. Cl.
  *G02B 6/44* (2006.01)
  *H01R 13/72* (2006.01)

(52) U.S. Cl.
  CPC ......... *G02B 6/4452* (2013.01); *G02B 6/4457* (2013.01); *H01R 13/72* (2013.01); *G02B 6/3897* (2013.01); *G02B 6/4453* (2013.01)

(58) Field of Classification Search
  USPC .......................................... 385/134–137, 139
  See application file for complete search history.

(56) References Cited

U.S. PATENT DOCUMENTS

| | | | |
|---|---|---|---|
| 3,901,564 A | 8/1975 | Armstrong | |
| 4,070,076 A | 1/1978 | Zwillinger | |
| 4,172,625 A | 10/1979 | Swain | |
| 4,320,934 A | 3/1982 | Röck et al. | |
| 4,359,262 A | 11/1982 | Dolan | |
| 4,373,776 A | 2/1983 | Purdy | |
| 4,494,806 A | 1/1985 | Williams et al. | |
| 4,502,754 A | 3/1985 | Kawa | |
| 4,585,303 A | 4/1986 | Pinsard et al. | |
| 4,595,255 A | 6/1986 | Bhatt et al. | |
| 4,630,886 A | 12/1986 | Lauriello et al. | |
| 4,697,874 A | 10/1987 | Nozick | |
| 4,699,455 A | 10/1987 | Erbe et al. | |
| 4,708,430 A | 11/1987 | Donaldson et al. | |
| 4,717,231 A | 1/1988 | Dewez et al. | |
| 4,737,039 A | 4/1988 | Sekerich | |
| 4,765,710 A | 8/1988 | Burmeister et al. | |
| 4,792,203 A | 12/1988 | Nelson et al. | |
| 4,820,007 A | 4/1989 | Ross et al. | |
| 4,840,449 A | 4/1989 | Ghandeharizadeh | |
| 4,898,448 A | 2/1990 | Cooper | |
| 4,971,421 A | 2/1990 | Cooper | |
| 4,986,762 A | 1/1991 | Keith | |
| 4,995,688 A | 2/1991 | Anton et al. | |
| 5,024,498 A | 6/1991 | Becker et al. | |
| 5,066,149 A | 11/1991 | Wheeler et al. | |
| 5,067,678 A | 11/1991 | Henneberger et al. | |
| 5,071,211 A | 12/1991 | Debortoli et al. | |
| 5,100,221 A | 3/1992 | Carney et al. | |
| 5,127,082 A | 6/1992 | Below et al. | |
| 5,129,030 A | 7/1992 | Petrunia | |
| 5,138,688 A | 8/1992 | Debortoli | |
| 5,142,606 A | 8/1992 | Carney et al. | |
| 5,142,607 A | 8/1992 | Petrotta et al. | |
| 5,174,675 A | 12/1992 | Martin | |
| 5,240,209 A | 8/1993 | Kutsch | |
| 5,247,603 A | 9/1993 | Viadacovich et al. | |
| 5,275,064 A | 1/1994 | Hobbs | |
| 5,285,515 A | 2/1994 | Milanowski et al. | |
| 5,289,558 A | 2/1994 | Teichler et al. | |
| 5,316,243 A | 5/1994 | Henneberger | |
| 5,323,480 A | 6/1994 | Mullaney et al. | |
| 5,335,349 A | 8/1994 | Kutsch et al. | |
| 5,339,379 A | 8/1994 | Kutsch et al. | |
| 5,353,367 A | 10/1994 | Czosnowski et al. | |
| 5,363,466 A | 11/1994 | Milanowskki et al. | |
| 5,363,467 A | 11/1994 | Keith | |
| 5,402,515 A | 3/1995 | Vidacovich et al. | |
| 5,412,751 A | 5/1995 | Siemon et al. | |
| 5,430,823 A | 7/1995 | Dupont et al. | |
| 5,438,641 A | 8/1995 | Malacarne | |
| 5,490,229 A | 2/1996 | Ghanderharizadeh et al. | |
| 5,497,444 A | 3/1996 | Wheeler | |
| 5,509,096 A | 4/1996 | Easley | |
| 5,511,144 A | 4/1996 | Hawkins et al. | |
| 5,530,783 A | 6/1996 | Belopolsky et al. | |
| 5,570,450 A | 10/1996 | Fernandez et al. | |
| 5,613,030 A | 3/1997 | Hoffer et al. | |
| 5,640,481 A | 6/1997 | Llewellyn et al. | |
| 5,655,044 A | 8/1997 | Finzel et al. | |
| 5,717,810 A | 2/1998 | Wheeler | |
| 5,724,469 A | 3/1998 | Orlando | |
| 5,802,237 A | 9/1998 | Pulido | |
| 5,811,055 A | 9/1998 | Geiger | |
| 5,836,148 A | 11/1998 | Fukao | |
| 5,882,100 A | 3/1999 | Rock | |
| 5,887,106 A | 3/1999 | Cheeseman et al. | |
| 5,917,984 A | 6/1999 | Röseler et al. | |
| 5,923,753 A | 7/1999 | Haataja et al. | |
| 5,946,440 A | 8/1999 | Puetz | |
| 5,966,492 A | 10/1999 | Bechamps et al. | |
| 5,971,626 A | 10/1999 | Knodell et al. | |
| 5,975,769 A | 11/1999 | Larson et al. | |
| 5,978,540 A | 11/1999 | Bechamps et al. | |
| 6,009,224 A | 12/1999 | Allen | |
| 6,022,150 A | 2/2000 | Erdman et al. | |
| 6,027,252 A | 2/2000 | Erdman et al. | |
| 6,044,194 A | 3/2000 | Meyerhoefer | |
| 6,076,908 A | 6/2000 | Maffeo | |
| 6,215,938 B1 | 4/2001 | Reitmeier et al. | |
| 6,226,436 B1 | 5/2001 | Daoud et al. | |
| 6,236,795 B1 | 5/2001 | Rodgers | |
| 6,269,214 B1 | 7/2001 | Naudin et al. | |
| 6,301,424 B1 | 10/2001 | Hwang | |
| 6,360,050 B1 | 3/2002 | Moua et al. | |
| 6,438,310 B1 | 8/2002 | Lance et al. | |
| 6,439,523 B1 | 8/2002 | Chandler et al. | |
| 6,496,638 B1 | 12/2002 | Anderson | |
| 6,504,988 B1 | 1/2003 | Trebesch et al. | |
| 6,591,051 B2 | 7/2003 | Solheid et al. | |
| 6,594,434 B1 | 7/2003 | Davidson et al. | |
| 6,600,866 B2 | 7/2003 | Gatica et al. | |
| RE38,311 E | 11/2003 | Burmeister et al. | |
| 6,677,520 B1 | 1/2004 | Kim et al. | |
| 6,715,619 B2 | 4/2004 | Kim et al. | |
| 6,748,155 B2 | 6/2004 | Kim et al. | |
| 6,768,860 B2 | 7/2004 | Liberty | |
| 6,804,447 B2 | 10/2004 | Smith et al. | |
| 6,809,258 B1 | 10/2004 | Dang et al. | |
| 6,810,193 B1 | 10/2004 | Müller | |
| 6,845,208 B2 | 1/2005 | Thibault et al. | |
| 6,865,331 B2 | 3/2005 | Mertesdorf | |
| 6,925,241 B2 | 8/2005 | Bohle et al. | |
| 6,934,457 B2 | 8/2005 | Vincent et al. | |
| 6,945,620 B2 | 9/2005 | Lam et al. | |
| 6,968,111 B2 | 11/2005 | Trebesch et al. | |
| 7,006,748 B2 | 2/2006 | Dagley et al. | |
| 7,068,907 B2 | 6/2006 | Schray | |
| 7,079,744 B2 | 7/2006 | Douglas et al. | |
| 7,116,777 B2 | 10/2006 | Knudsen et al. | |
| 7,120,348 B2 | 10/2006 | Trebesch et al. | |
| 7,171,099 B2 | 1/2007 | Barnes et al. | |
| 7,302,153 B2 | 11/2007 | Thom | |
| 7,302,154 B2 | 11/2007 | Trebesch et al. | |
| 7,308,184 B2 | 12/2007 | Barnes et al. | |
| 7,367,823 B2 | 5/2008 | Rapp et al. | |
| 7,373,071 B2 | 5/2008 | Douglas et al. | |
| 7,406,240 B2 | 7/2008 | Murano | |
| 7,409,137 B1 | 8/2008 | Barnes | |
| 7,460,757 B2 | 12/2008 | Hoehne et al. | |
| 7,463,811 B2 | 12/2008 | Trebesch et al. | |
| 7,496,268 B2 | 2/2009 | Escoto et al. | |
| 7,499,623 B2 | 3/2009 | Barnes et al. | |
| 7,664,361 B2 | 2/2010 | Trebesch et al. | |
| 7,689,089 B2 | 3/2010 | Wagner et al. | |
| 7,706,656 B2 | 4/2010 | Zimmel | |
| 7,715,681 B2 | 5/2010 | Krampotich et al. | |
| 7,747,125 B1 | 6/2010 | Lee et al. | |
| RE41,460 E | 7/2010 | Wheeler | |
| 7,751,647 B2 | 7/2010 | Hill | |
| 7,764,859 B2 | 7/2010 | Krampotich et al. | |

(56) References Cited

U.S. PATENT DOCUMENTS

| | | |
|---|---|---|
| 7,856,166 B2 | 12/2010 | Biribuze et al. |
| 7,869,683 B2 | 1/2011 | Barnes et al. |
| 7,876,993 B2 | 1/2011 | Krampotich et al. |
| 7,889,961 B2 | 2/2011 | Cote et al. |
| 7,945,138 B2 | 5/2011 | Hill et al. |
| 8,027,558 B2 | 9/2011 | Barnes et al. |
| 8,059,932 B2 | 11/2011 | Hill et al. |
| 8,078,030 B2 | 12/2011 | Trebesch et al. |
| 8,195,022 B2 | 6/2012 | Coburn et al. |
| 8,285,104 B2 | 10/2012 | Davis et al. |
| 8,374,477 B2 | 2/2013 | Hill |
| 8,452,149 B2 | 5/2013 | Krampotich et al. |
| 8,559,785 B2 | 10/2013 | Barlowe et al. |
| 8,600,208 B2 | 12/2013 | Badar et al. |
| 8,639,081 B2 | 1/2014 | Barnes et al. |
| 8,655,136 B2 | 2/2014 | Trebesch et al. |
| 8,690,593 B2 | 4/2014 | Anderson et al. |
| 9,075,203 B2 | 7/2015 | Holmberg |
| 2001/0001270 A1 | 5/2001 | Williams Vigliaturo |
| 2002/0181922 A1 | 12/2002 | Xin et al. |
| 2003/0007767 A1 | 1/2003 | Douglas et al. |
| 2003/0128951 A1 | 7/2003 | Lecomte et al. |
| 2003/0165315 A1 | 9/2003 | Trebesch et al. |
| 2003/0174996 A1 | 9/2003 | Henschel et al. |
| 2003/0190035 A1 | 10/2003 | Knudsen et al. |
| 2004/0011750 A1 | 1/2004 | Kim et al. |
| 2004/0013390 A1 | 1/2004 | Kim et al. |
| 2004/0136676 A1 | 7/2004 | Mertesdorf |
| 2004/0175090 A1 | 9/2004 | Vastmans et al. |
| 2004/0258384 A1 | 12/2004 | Trebesch et al. |
| 2005/0025444 A1 | 2/2005 | Barnes et al. |
| 2005/0058421 A1 | 3/2005 | Dagley et al. |
| 2005/0078929 A1 | 4/2005 | Iwanek |
| 2005/0100301 A1 | 5/2005 | Solheid et al. |
| 2005/0123261 A1 | 6/2005 | Bellekens et al. |
| 2006/0093302 A1 | 5/2006 | Solheid et al. |
| 2006/0275008 A1 | 12/2006 | Xin |
| 2007/0003204 A1 | 1/2007 | Makrides-Saravanos et al. |
| 2007/0031099 A1 | 2/2007 | Herzog et al. |
| 2007/0036506 A1 | 2/2007 | Kewitsch |
| 2007/0047894 A1 | 3/2007 | Holmberg et al. |
| 2007/0201806 A1 | 8/2007 | Douglas et al. |
| 2008/0175550 A1 | 7/2008 | Coburn et al. |
| 2009/0067800 A1 | 3/2009 | Vazquez et al. |
| 2009/0067802 A1 | 3/2009 | Hoehne et al. |
| 2009/0097813 A1 | 4/2009 | Hill |
| 2009/0103879 A1 | 4/2009 | Tang et al. |
| 2009/0214171 A1 | 8/2009 | Coburn et al. |
| 2009/0226142 A1 | 9/2009 | Barnes et al. |
| 2009/0245743 A1 | 10/2009 | Cote et al. |
| 2009/0274431 A1 | 11/2009 | Krampotich et al. |
| 2010/0142910 A1 | 6/2010 | Hill et al. |
| 2010/0158465 A1 | 6/2010 | Smrha |
| 2010/0183276 A1 | 7/2010 | Smith |
| 2010/0266253 A1 | 10/2010 | Krampotich et al. |
| 2010/0316346 A1 | 12/2010 | Krampotich et al. |
| 2010/0322578 A1 | 12/2010 | Cooke et al. |
| 2010/0322579 A1 | 12/2010 | Cooke et al. |
| 2011/0019964 A1 | 1/2011 | Nhep et al. |
| 2011/0026894 A1 | 2/2011 | Rudenick et al. |
| 2011/0188809 A1 | 8/2011 | LeBlanc et al. |
| 2011/0211799 A1 | 9/2011 | Conner et al. |
| 2011/0217016 A1 | 9/2011 | Mullsteff |
| 2011/0267794 A1 | 11/2011 | Anderson et al. |
| 2011/0268404 A1 | 11/2011 | Cote et al. |
| 2011/0268408 A1 | 11/2011 | Giraud et al. |
| 2011/0268410 A1 | 11/2011 | Giraud et al. |
| 2011/0268412 A1 | 11/2011 | Giraud et al. |
| 2011/0268414 A1 | 11/2011 | Giraud et al. |
| 2011/0286712 A1 | 11/2011 | Puetz et al. |
| 2011/0317974 A1 | 12/2011 | Krampotich et al. |
| 2012/0051708 A1 | 3/2012 | Badar et al. |
| 2012/0057838 A1 | 3/2012 | Hill et al. |
| 2012/0237173 A1 | 9/2012 | Alston et al. |
| 2013/0089292 A1 | 4/2013 | Ott et al. |
| 2013/0089298 A1 | 4/2013 | Holmberg et al. |
| 2013/0148936 A1 | 6/2013 | Hill |
| 2013/0183018 A1 | 7/2013 | Holmberg |
| 2013/0287359 A1 | 10/2013 | Haataja |
| 2014/0086545 A1 | 3/2014 | Solheid et al. |
| 2014/0133819 A1 | 5/2014 | Trebesch et al. |
| 2014/0259602 A1 | 9/2014 | Thompson |

FOREIGN PATENT DOCUMENTS

| | | |
|---|---|---|
| CN | 102203653 A | 9/2011 |
| DE | 27 35 106 A1 | 2/1979 |
| DE | 29 18 309 A1 | 11/1980 |
| DE | 33 08 682 A1 | 9/1984 |
| DE | 38 36 273 A1 | 4/1990 |
| DE | 44 13 136 C1 | 5/1995 |
| DE | 295 04 1 91 U | 3/1996 |
| EP | 0 146 478 A2 | 6/1985 |
| EP | 0 149 250 A2 | 7/1985 |
| EP | 0 356 942 A2 | 7/1990 |
| EP | 0 406 151 A2 | 1/1991 |
| EP | 0 464 570 A1 | 1/1992 |
| EP | 0 479 226 A1 | 4/1992 |
| EP | 0 196 102 B1 | 3/1993 |
| EP | 0 538 164 A1 | 4/1993 |
| EP | 0 801 317 A2 | 10/1997 |
| EP | 0 563 995 B1 | 10/1999 |
| FR | 2 531 576 A1 | 2/1984 |
| FR | 2 587 127 A1 | 3/1987 |
| FR | 2 678 076 A1 | 12/1992 |
| JP | 59-074523 A | 4/1984 |
| JP | 60-169811 A | 9/1985 |
| JP | 61-055607 A | 3/1986 |
| JP | 61-090104 A | 5/1986 |
| KR | 20-0337929 | 1/2004 |
| KR | 2008-0033420 A | 4/2008 |
| KR | 10-2010-0027636 A | 3/2010 |
| WO | 91/10927 A1 | 7/1991 |
| WO | 95/07480 A1 | 3/1995 |
| WO | 96/10203 A1 | 4/1996 |
| WO | 99/00619 A1 | 1/1999 |
| WO | 03/005095 A2 | 1/2003 |
| WO | 2010/083369 A1 | 7/2010 |
| WO | 2013/177413 A1 | 11/2013 |
| WO | 2016/029171 A1 | 2/2016 |

OTHER PUBLICATIONS

"ITU Fiber Handbook" with English translation, 14 pages, Mar. 1992.

"Precision Mechanical" with English translation, 5 pages.

Northern Telecom Bulletin #91-004, Issue #2, May 1991.

AT&T Product Bulletin 2987D-DLH-7/89, "High Density Interconnect System (HDIC)," Issue 2 (Copyright 1989).

Preface to the book "Structure, Installation, Connection and Protection of Communication Optical Fiber Cable," in Chinese with English Translation, 14 pages (Mar. 1992).

Complaint relating to Civil Action No. 5:11-cv-02509-JS, *ADC Telecommunications, Inc v. Opterna Am, Inc.* filed Apr. 11, 2011 (14 pages).

Complaint relating to Civil Action No. 1:11cv-735 (GBL-IDD), *ADC Telecommunications, Inc v. Opterna Am, Inc.* filed Jul. 12, 2011 (5 pages).

Plaintiffs Notice of Dismissal relating to Civil Action No. 5:11-cv-02509-JS, *ADC Telecommunications, Inc v. Opterna Am, Inc.* filed Jul. 12, 2011 (1 page).

Stipulation and Order of Dismissal relating to Civil Action No. 1:11-cv-735-GBL-IDD, *ADC Telecommunications, Inc v. Opterna Am, Inc.* filed Feb. 21, 2012 (2 pages).

Extended European Search Report for corresponding European Patent Application No. 15867719.5 dated Jun. 27, 2018, 8 pages.

FIBER OPTIC CABLE SLACK MANAGEMENT MODULE

CROSS REFERENCE TO RELATED APPLICATION

This application is a continuation of U.S. patent application Ser. No. 16/352,267, filed on Mar. 13, 2019, now U.S. Pat. No. 10,830,959, which is a continuation of U.S. patent application Ser. No. 15/533,837, filed on Jun. 7, 2017, now U.S. Pat. No. 10,247,886, which is a National Stage Application of PCT/US2015/064345, filed on Dec. 7, 2015, which claims the benefit of U.S. Patent Application Ser. No. 62/090,203, filed on Dec. 10, 2014, the disclosures of which are incorporated herein by reference in their entireties. To the extent appropriate, a claim of priority is made to each of the above disclosed applications.

FIELD

The present invention relates to apparatus and methods for termination and storage of optical fiber cables, such as distribution cables.

BACKGROUND

With respect to termination and storage of optical fibers including distribution fibers, various concerns exist. One concern is providing high density to minimize needed space. In the case of outside plant enclosures, a reduced size for the enclosures and the internal structures is preferred.

A further concern related to termination and storage of optical fiber cables is the ease of access to the cables and the terminations. Such ease of use is desired during assembly, during installation in the field, and later when changes or modifications to the system are desired requiring adding or removing terminations, or when cleaning and checking the terminations.

A further concern in the area of termination and storage of optical fiber cables includes protecting the optical fiber from damage from excess bending below the minimum bend radius of the cable. Such protection of the fibers is desired during assembly and installation, and later when individual terminations and cables are accessed for cleaning or modification.

Further improvements in these areas are desired.

SUMMARY

The present disclosure relates to a fiber optic cable slack storage/management module for managing slack associated with fiber terminations in a distribution chassis or frame. The cable slack module includes a base defining a first cable management spool, an outer face of which is configured to contact cables when cables are pulled away from the base, and a second cable management spool, within which the first cable management spool is located. An inner face of the second cable management spool is configured to contact cables when cables are in a relaxed, non-pulled state. The fiber optic cable slack management module defines a cable exit adjacent the first cable management spool and defined at least partially by the inner face of the second cable management spool, the cable exit defined by a channel positioned between the first and second cable management spools.

A further aspect of the present disclosure relates to a fiber optic telecommunications system comprising a telecommunications chassis including at least one movable adapter module mounted to the chassis and at least one cable slack management module mounted to the chassis adjacent the at least one adapter module, the cable slack management module configured to manage cables extending from fiber optic connectors coupled to adapters of the adapter module. The at least one cable slack management module includes a base defining a first cable management spool, an outer face of which is configured to contact cables when cables are pulled away from the base, and a second cable management spool, within which the first cable management spool is located. An inner face of the second cable management spool is configured to contact cables when cables are in a relaxed, non-pulled state. The fiber optic cable slack management module defines a cable exit adjacent the first cable management spool and defined at least partially by the inner face of the second cable management spool, the cable exit defined by a channel positioned between the first and second cable management spools.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
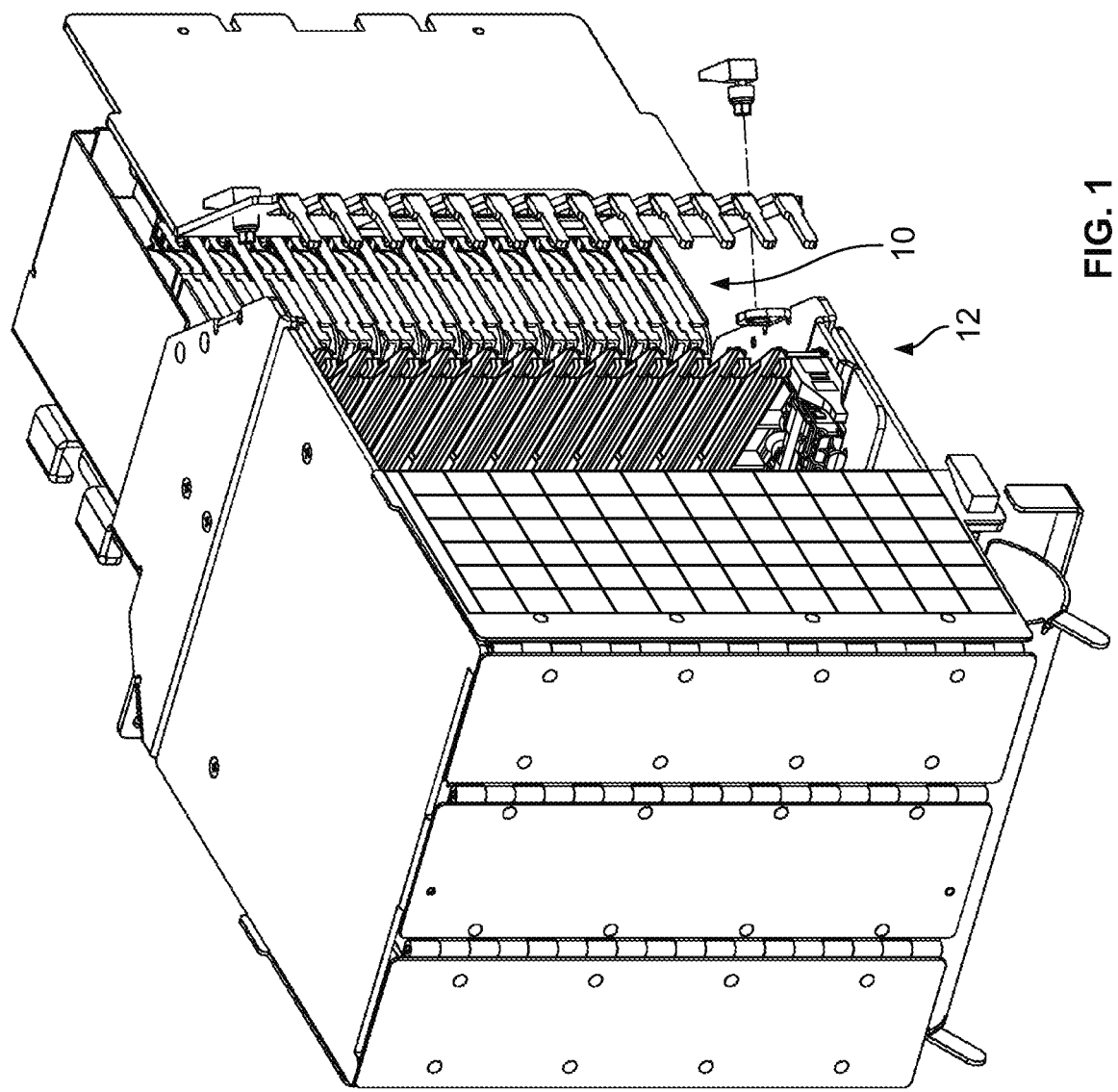
FIG. 1 is a front perspective view of a telecommunications chassis including a plurality of cable slack management modules having inventive aspects in accordance with the present disclosure mounted thereon.
Figure 2:
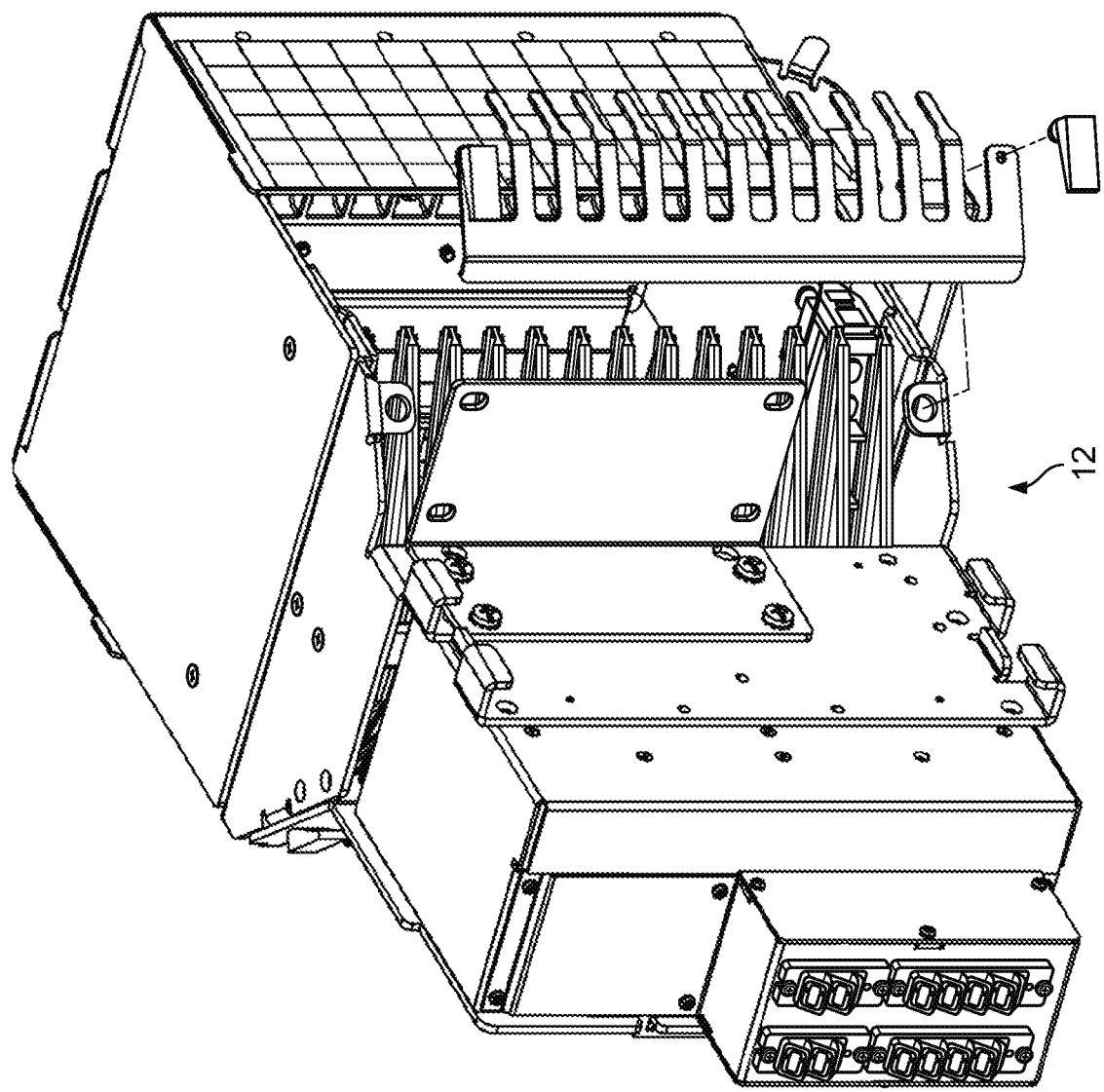
FIG. 2 is a rear perspective view of the chassis of FIG. 1.
Figure 3:
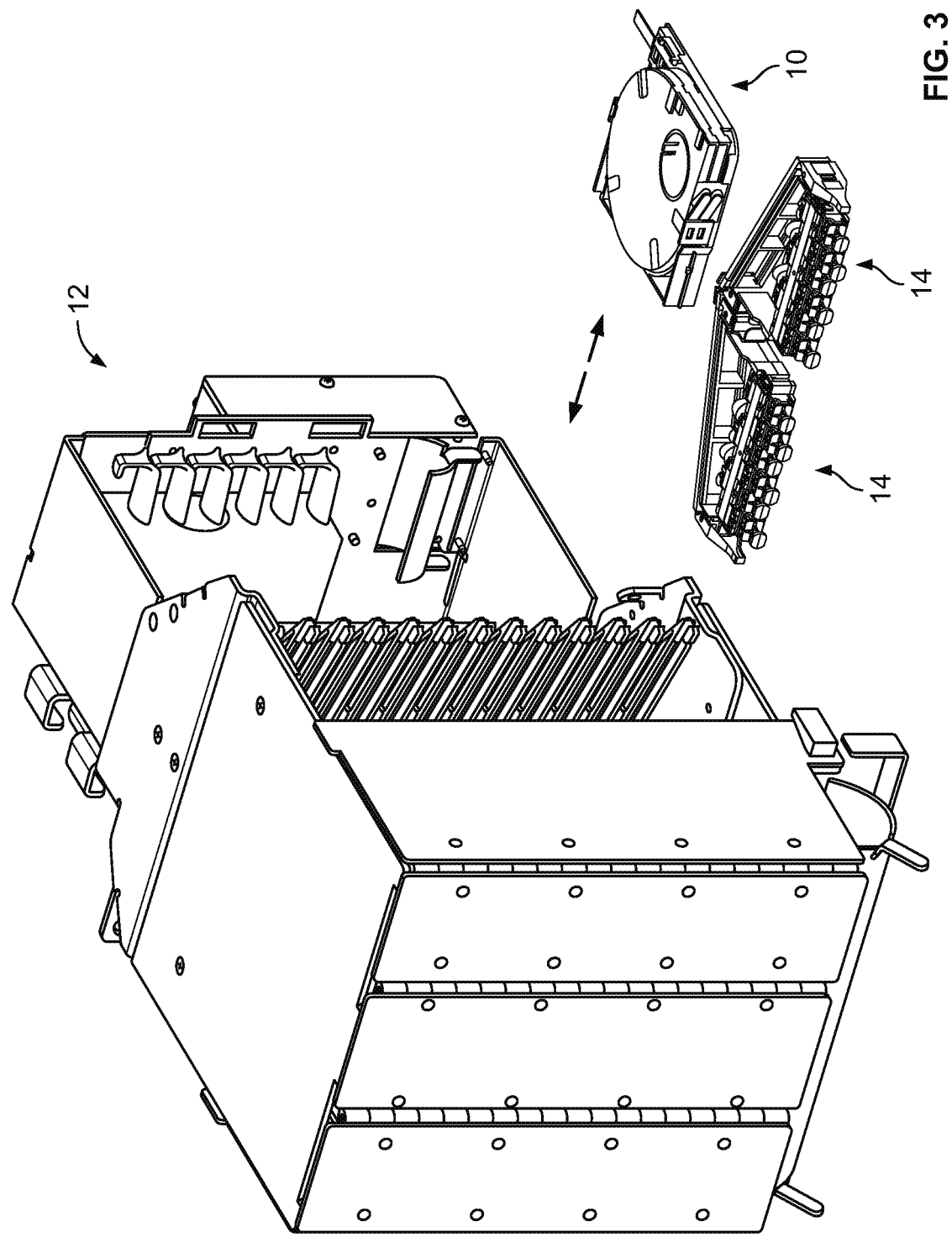
FIG. 3 illustrates the chassis of FIG. 1 with one of the cable slack management modules and a sliding adapter module of the chassis exploded off the chassis.
Figure 4:
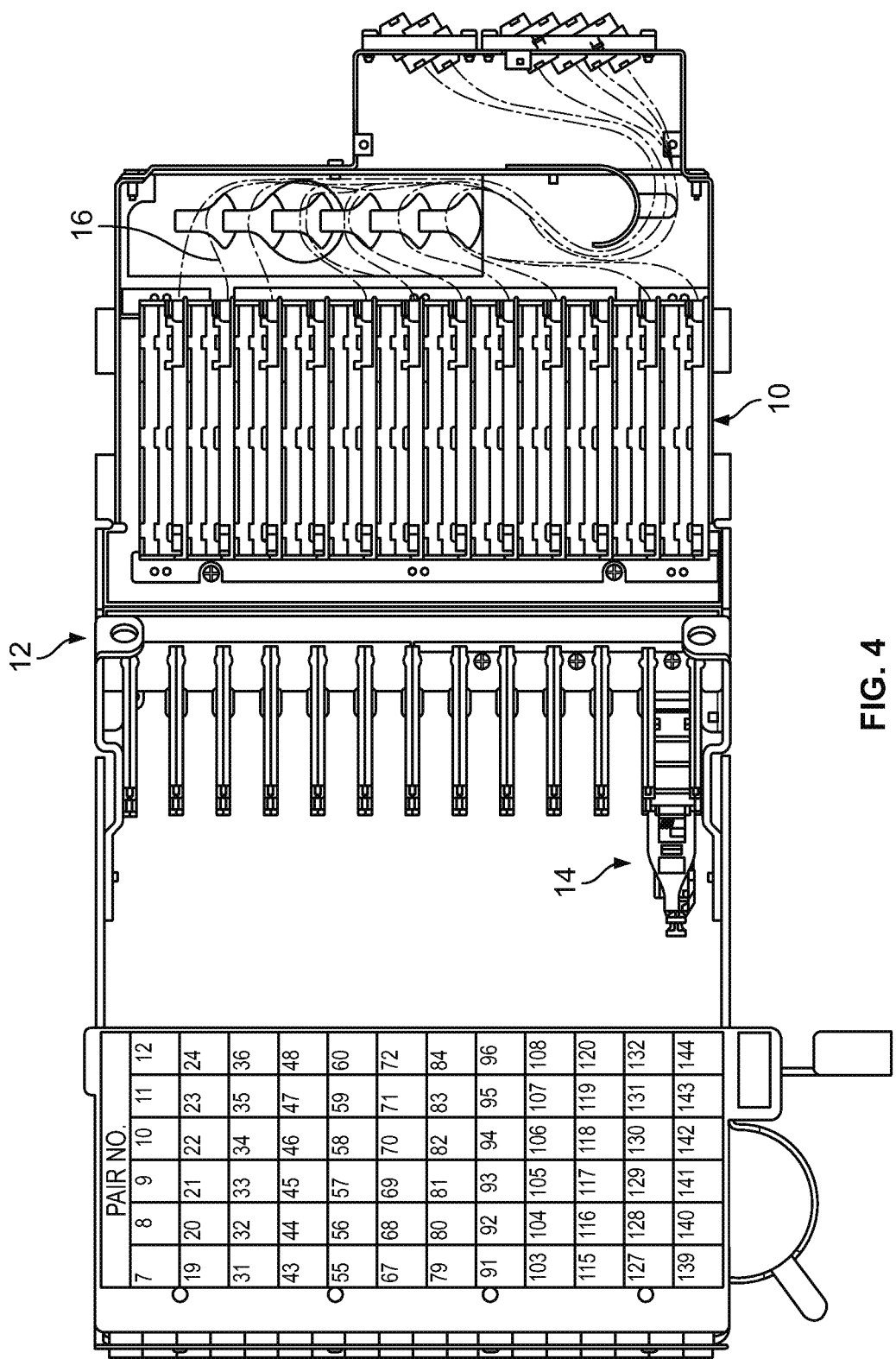
FIG. 4 is a side view of the chassis of FIGS. 1-3 illustrating the cable slack management modules mounted in a stacked configuration.
Figure 5:
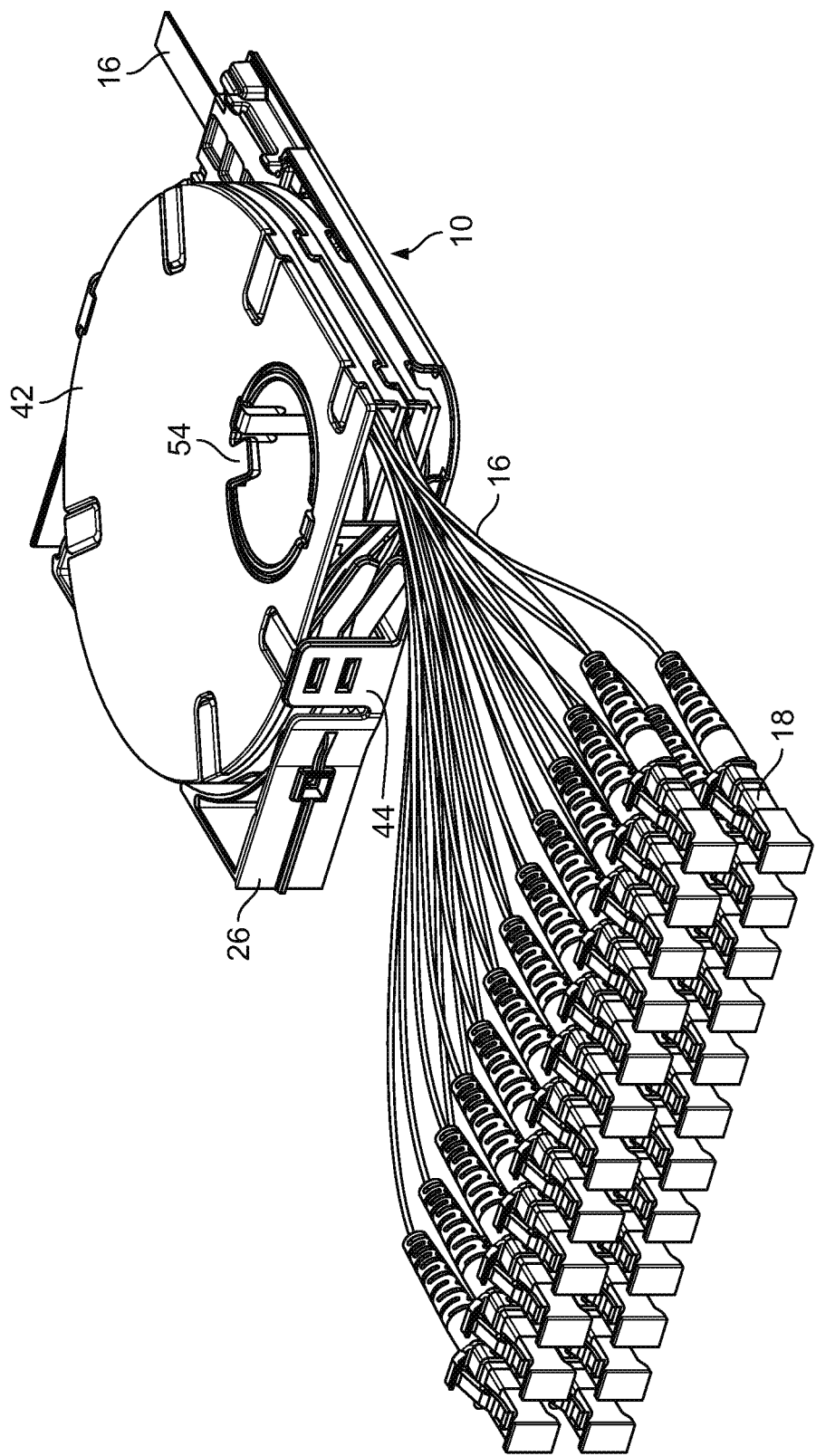
FIG. 5 is a front perspective view of one of the cable slack management modules shown in isolation.
Figure 6:
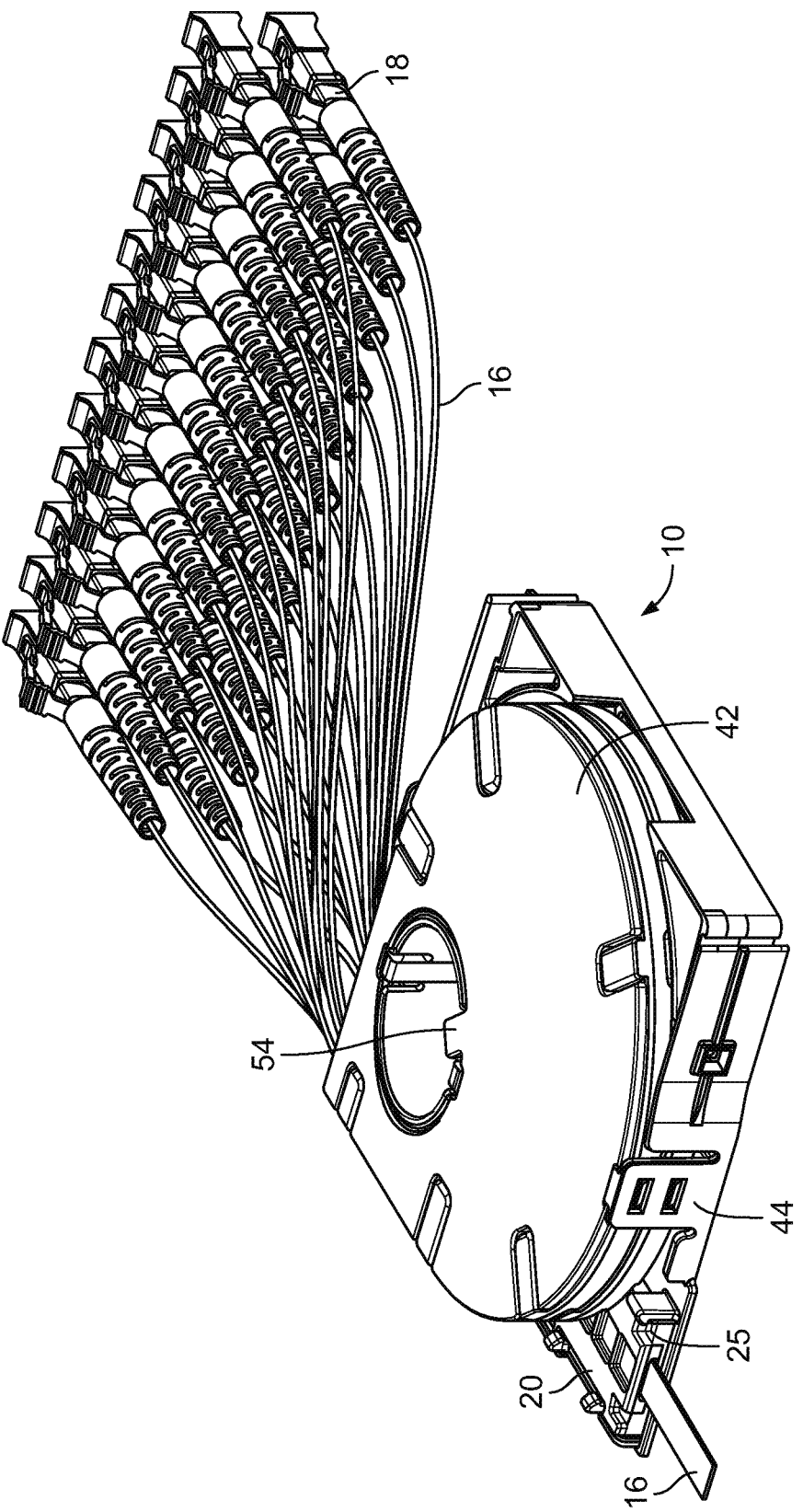
FIG. 6 is a rear perspective view of the cable slack management module of FIG. 5.
Figure 7:
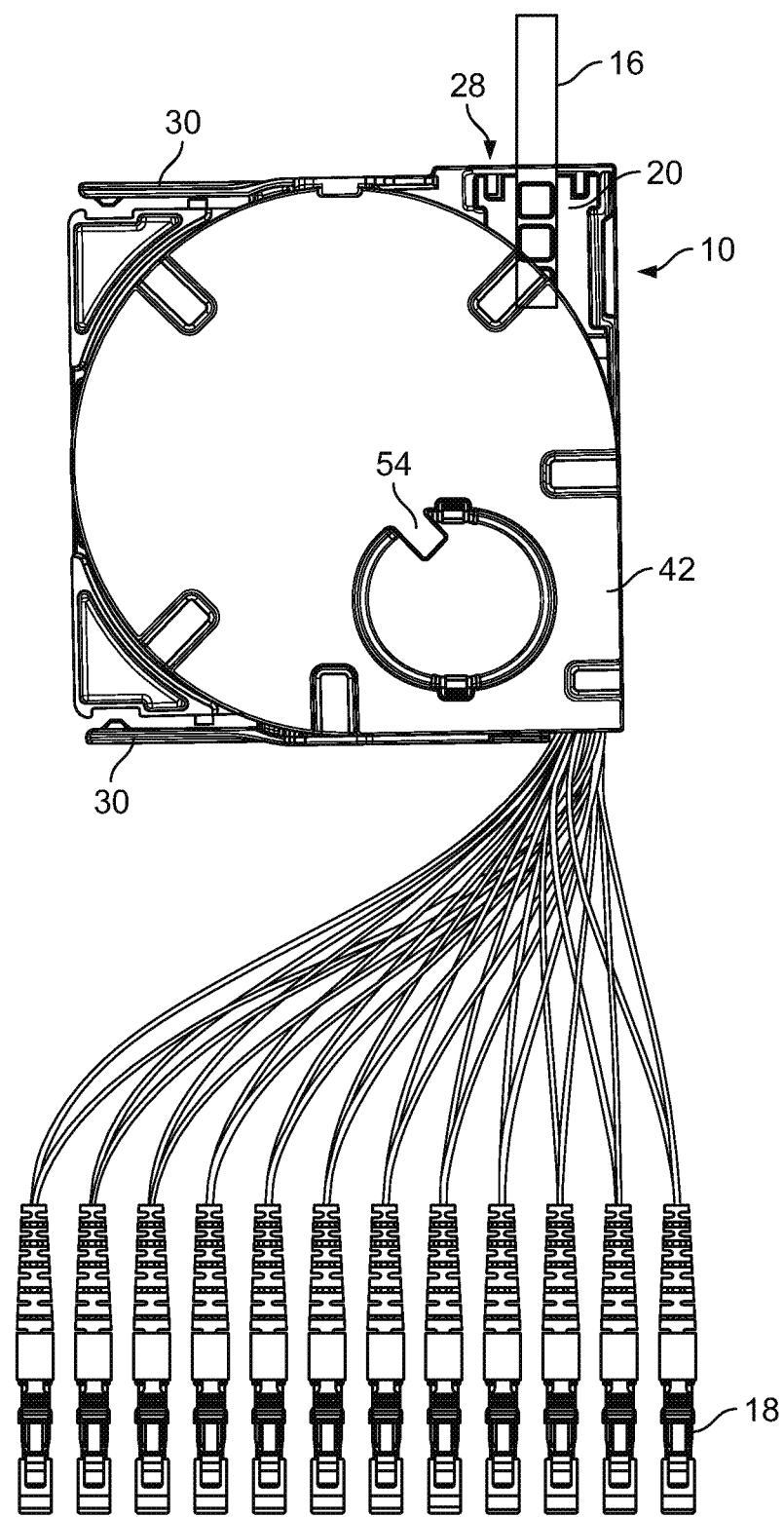
FIG. 7 is a top view of the cable slack management module of FIG. 5.
Figure 8:
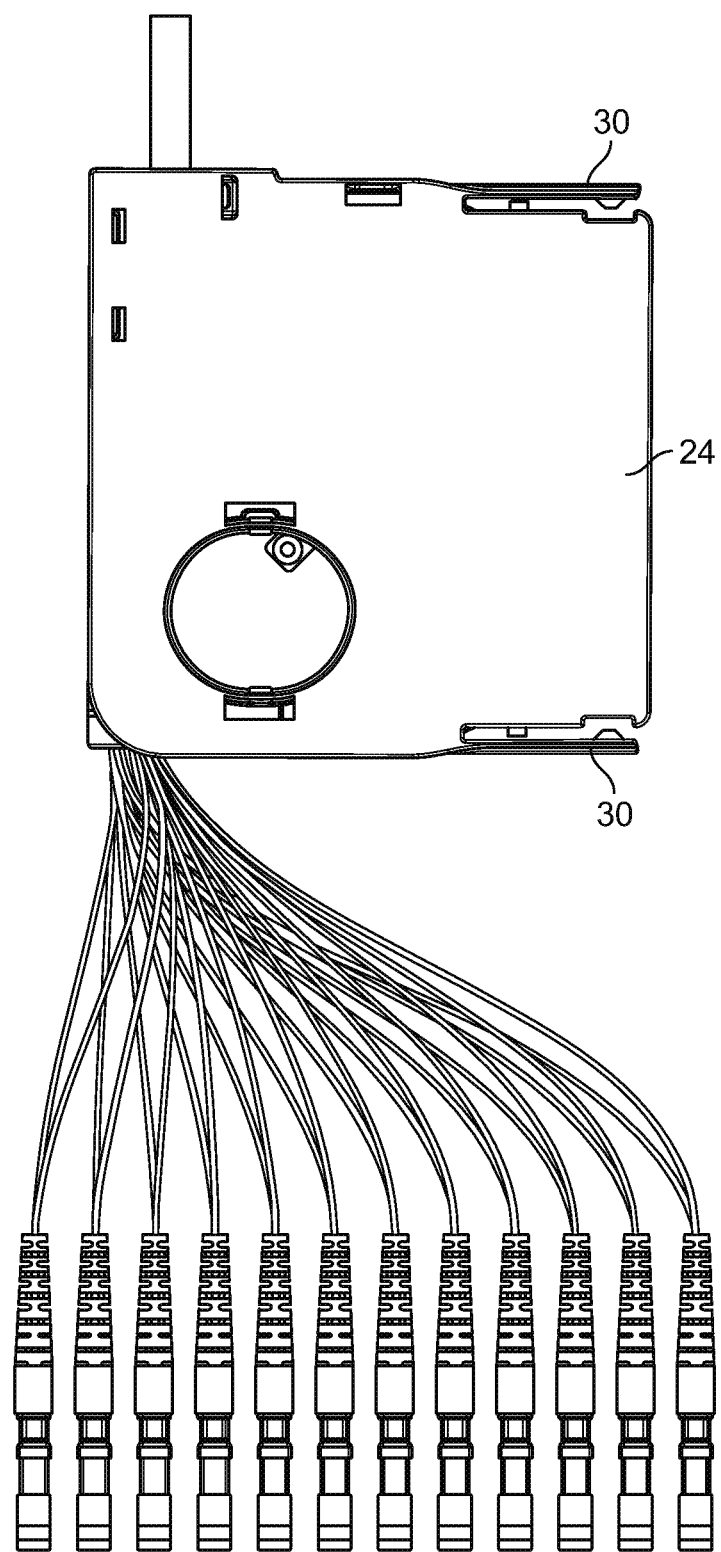
FIG. 8 is a bottom view of the cable slack management module of FIG. 5.
Figure 9:
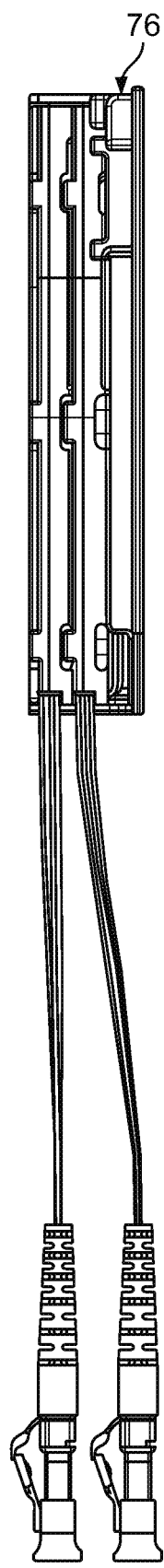
FIG. 9 is a side view of the cable slack management module of FIG. 5.
Figure 10:
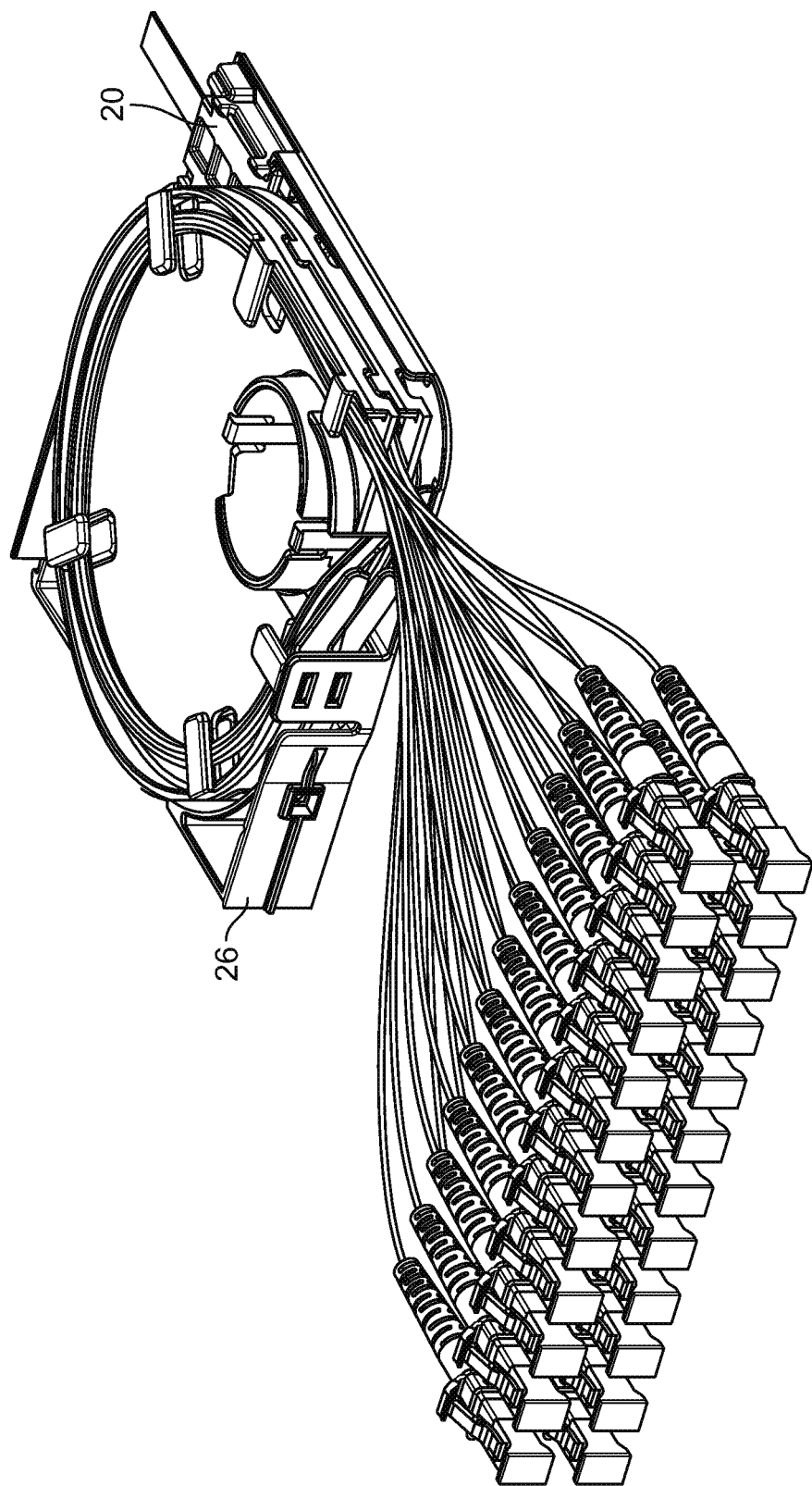
FIG. 10 illustrates the cable slack management module of FIG. 5 with the upper cover removed to show the internal features.
Figure 11:
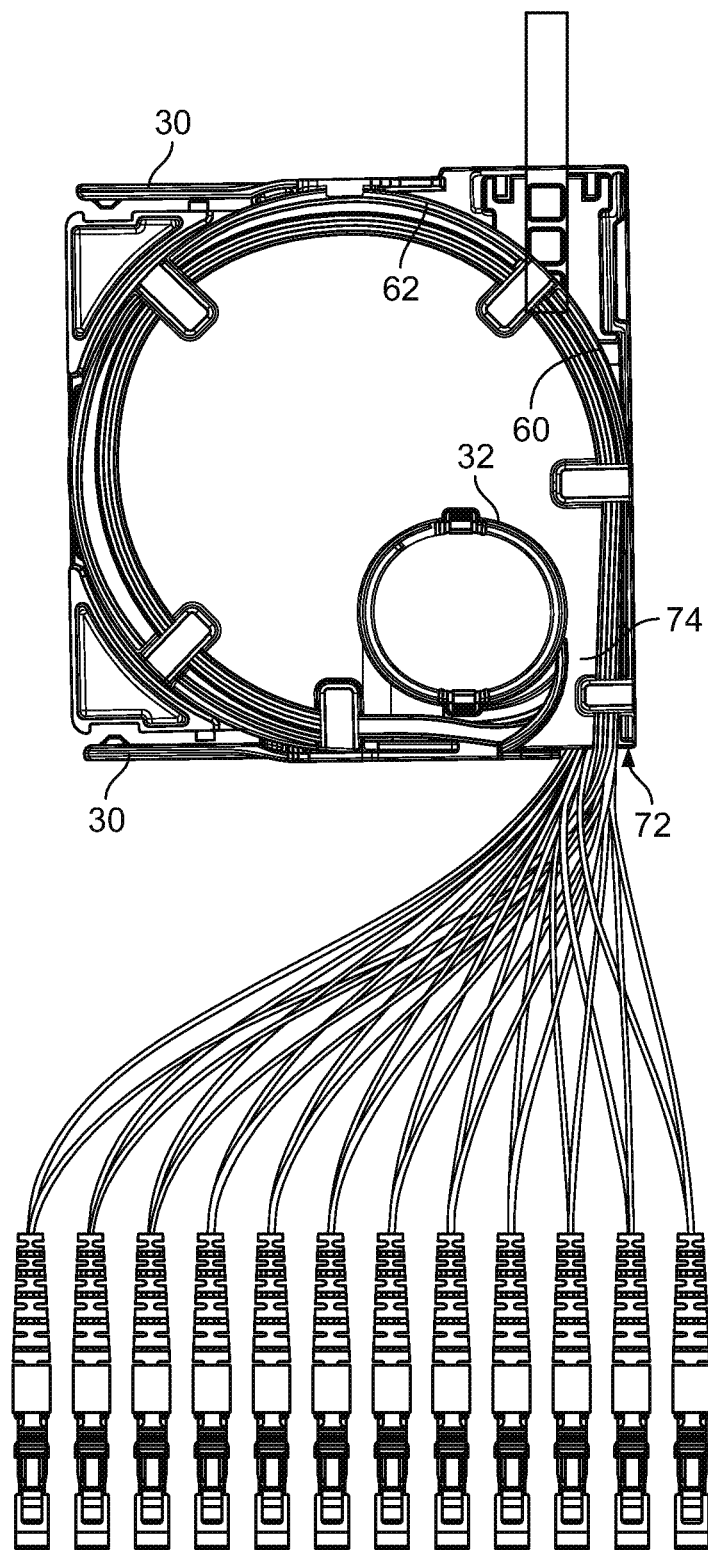
FIG. 11 illustrates the cable slack management module of FIG. 10 from a top view.
Figure 12:
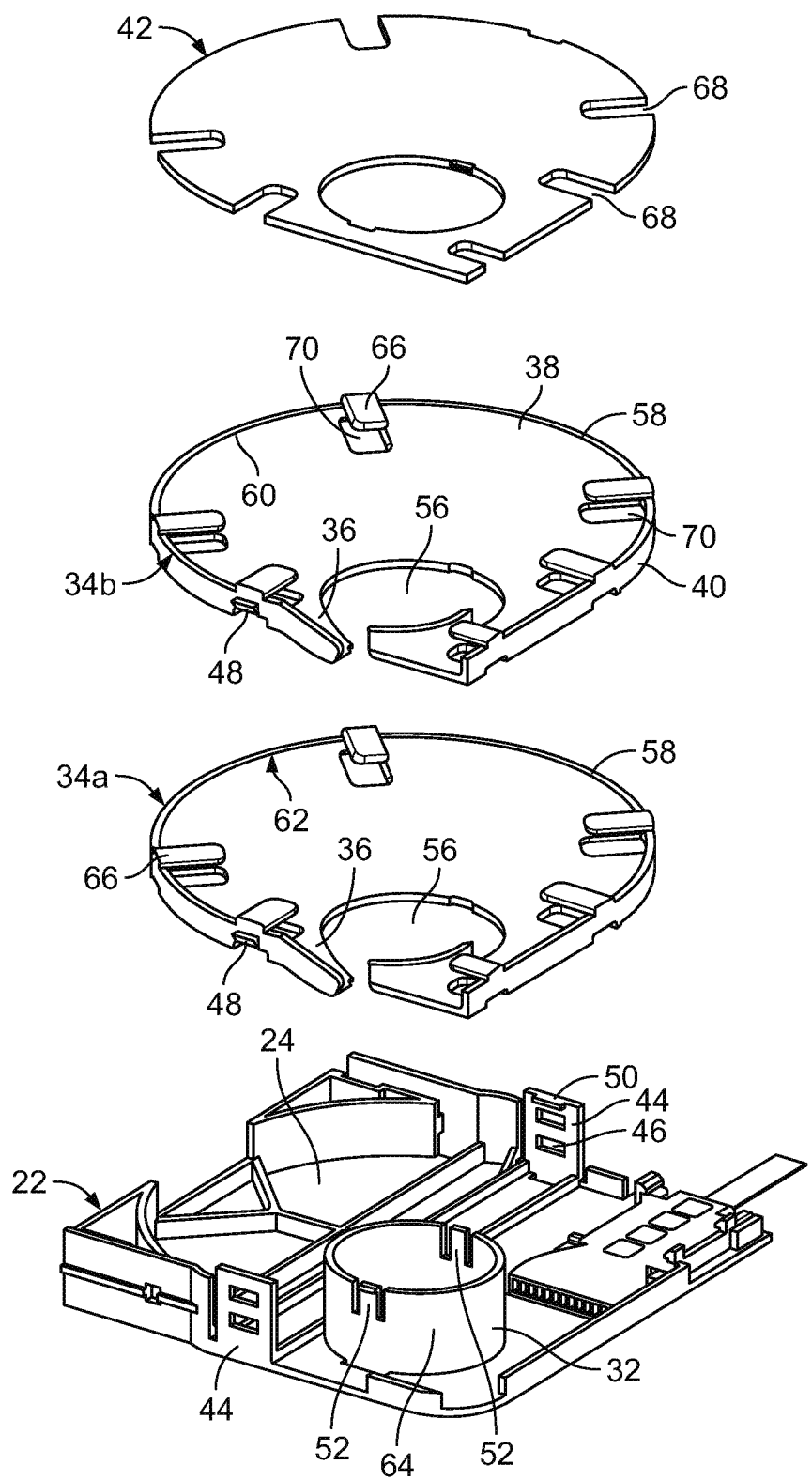
FIG. 12 illustrates the cable slack management module of FIG. 5 in an exploded configuration.

Referring now to FIGS. 1-17, a fiber optic cable slack management/storage module 10 having inventive aspects in accordance with the present disclosure is illustrated. In FIGS. 1-4, a plurality of the cable slack management modules 10 is illustrated as mounted on a telecommunications fixture 12 (i.e., frame, chassis) in a stacked arrangement. The cable slack management modules 10 are mounted adjacent sliding adapter modules 14. The cable slack management modules 10 are configured to manage the cabling 16 (or cable slack) extending from connectors 18 coupled to the adapter modules 14.

As will be described in further detail, the cabled fibers 16 terminated by the connectors 18 coupled to the sliding adapter modules 14 are input into the cable slack management module 10 via an optical device 20 (e.g., a fan-out in the depicted embodiment). The configuration of the cable slack management module 10 allows extra cable slack 16 to be stored therewithin such that the extra cable slack 16 can be used when the sliding adapter modules 14 are moved outwardly from the telecommunications fixture 12, without violating minimum bending requirements.

Referring now to FIGS. 5-17, where one of the cable slack management modules 10 is illustrated in isolation, each cable slack management module 10 includes a base 22 with a bottom wall 24 and vertically extending peripheral walls 26. The base 22 defines a fan-out pocket 25 for receiving the fan-out 20 with a snap-fit interlock. The fan-out pocket 25 is defined partially by the bottom wall 24. The fan-out pocket 25 and the fan-out 20 define the fiber input portion 28 of the cable slack management module 10.

As shown in FIGS. 7, 8, 11, and 17, portions of the front and rear peripheral walls 26 of the base 22 define flexible cantilever arms 30 for providing a snap-fit interlock with the telecommunications fixture 12.

The base 22 defines a first spool 32 extending upwardly from the bottom wall 24 of the base 22. As will be described in further detail hereafter, the first spool 32 is one of the structures that provide the minimum bend radius protection for the cables 16 within the cable slack management module 10.

As shown in FIGS. 5-17, each cable slack management module 10 also defines a pair of cable storage trays 34. The trays 34 are mounted in a stacked arrangement onto the base 22 and define a lower tray 34a and an upper tray 34b. Cables 16 enter the individual trays 34 via a ramp 36 defined by each tray 34. After the fibers 16 are input into the cable slack management module 10 via the fan-out 20, half of the separated and cabled fibers 16 enter the lower tray 34a via the ramp 36 of the lower tray 34a and half of the separated and cabled fibers 16 enter the upper tray 34b via the ramp 36 of the upper tray 34b.

In the given embodiment of the cable slack management module 10, the upper tray 34b (the floor 38 thereof) forms the cover 40 of the lower tray 34a. The upper tray 34b defines a separate removable cover 42. The trays 34 are mounted via a snap-fit interlock to the base 22. As shown in FIGS. 5, 6, 10, 12, and 13-16, a flexible portion 44 of both the front peripheral wall 26 and the rear peripheral wall 26 of the base 22 defines notches 46 for receiving tabs 48 extending outwardly from the trays 34 for keeping the trays 34 mounted within the base 22.

The removable cover 42 of the upper tray 34b is also held in place by an inwardly extending tab 50 of the flexible portion 44 of the rear peripheral wall 26 and flexible cantilever arms 52 defined by the first spool 32. In certain embodiments, the cover 42 used with the upper tray 34b may be provided with a handle 54 to facilitate mounting and removal (see FIGS. 5-7).

Each of the upper and lower trays 34 defines an opening 56 through which the first spool 32 extends. Thus, the first spool 32 extends all the way from the bottom wall 24 to the cover 42 of the upper tray 34b.

Each tray 34 also includes a curved peripheral wall 58, the inner face 60 of which defines a second spool 62. The second spool 62 defined by each tray 34 cooperates with the first spool 32 in keeping the cable slack 16 stored and managed without violating minimum bend radius requirements.

The second spool 62 (i.e., the inner face 60 of the curved peripheral wall 58 of each tray 34) is configured to contact the cables 16 within the tray 34 when the cables 16 are in a relaxed state (when the sliding adapter modules 14 are in a non-extended position). An outer face 64 of the first spool 32 is configured to contact the cables 16 within the tray 34 when the cables 16 are pulled (when the sliding adapter modules 14 are moved to an extended position).

The combination of the first spool 32 and the second spool 62 provides the cables 16 with bend radius protection both in a relaxed state and in a pulled, tensioned state.

Each tray 34 also defines a plurality of cable retention fingers 66 extending inwardly from the peripheral wall 58. The cable retention fingers 66 facilitate initial assembly of the cable slack management module 10 as the cables 16 are being lead from the fan-out 20, up the ramps 36 and into the trays 34. In order to provide unobstructed movement of the cables 16 within the trays 34, however, the cable retention fingers 66 fit within notches 68 defined by the cover 42 for the upper tray 34b and notches 70 defined by the floor 38 of the upper tray 34b for the lower tray 34a. In this manner, a smooth, flush ceiling is created for each of the trays 34 and the cables 16 can move without any obstruction.

The cable exit portion 72 of the cable slack management module 10 is defined adjacent the first spool 32 and at least partially by the inner face 60 of the peripheral wall 58 of each tray 34 (i.e., the second spool 62), where the cable exit 72 is generally defined by a channel 74 positioned between the first and second spools 32, 62 as can be seen in FIGS. 10, 11, and 14-16. The cable exit portion 72 is generally aligned with the fiber input portion 28 of the cable slack management module 10 when viewing the module 10 in a front to back direction.

Thus, the optical fibers 16 enter the cable slack management module 10 via the fan-out 20 at a first common plane 76. The separated and cabled fibers 16 are then directed to multiple levels defined by the trays 34 via the ramps 36. The cables 16 are looped once around the trays 34 and exit the cable slack management module 10 via the cable exit channel 74. It should be noted that in the depicted embodiment, half of the cabled fibers 16 coming from the fan-out 20 are directed into the lower tray 34a and half are directed into the upper tray 34b.

The cables 16 exiting the cable slack management module 10 are terminated with fiber optic connectors 18 that are coupled to the adapters 17 of the sliding adapter modules 14.

Although shown with LC format connectors 18, in other embodiments, the cables 16 output from the cable slack management module 10 may be terminated with other types or footprints of connectors 18 such as SC or LX.5, such connectors 18 leading to adapter modules 14 having adapters 17 with matching footprints.

Examples of sliding adapter modules 14 that are usable with the cable slack management module 10 of the present disclosure are shown and described in further detail in U.S. Patent Application Ser. No. 62/040,314, filed Aug. 21, 2014, now PCT Application No. PCT/US2015/046392, filed Aug. 21, 2015, both titled "High Density Adapter Carrier Pack;" and U.S. Pat. Nos. 6,591,051 and 9,075,203, each of which is incorporated herein by reference in its entirety.

Now referring to FIGS. 13-17, even though the cable slack management module 10 has been described as being used as a cable slack storage/management device, the cable management module 10 can be set up to be used as a simple distribution or a fan-out module where fibers 16 entering the module 10 are output in a pass-through configuration, wherein one or more of the trays 34 are not used for carrying coiled cables 16.

Figure 13:
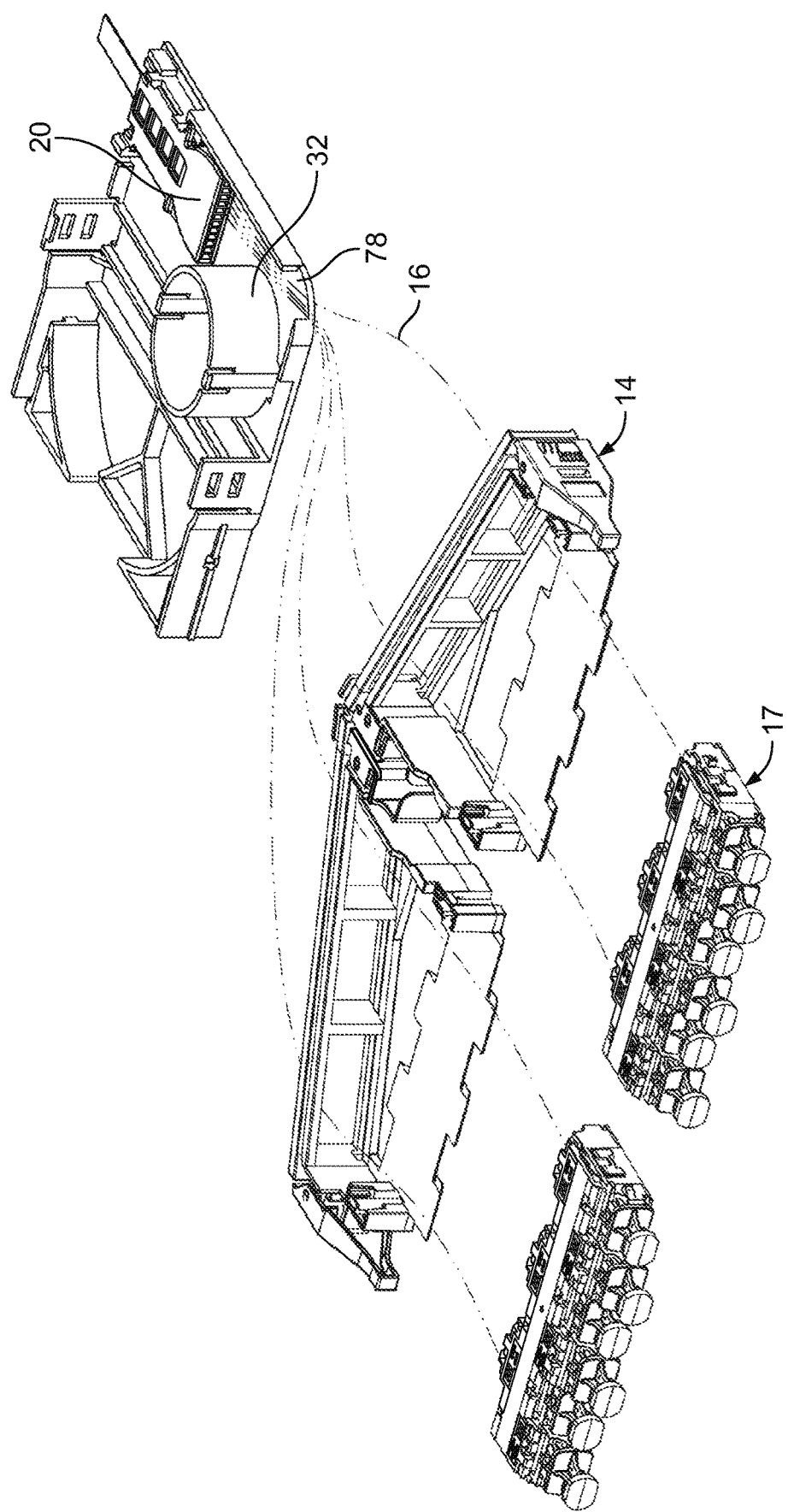
FIG. 13 illustrates the cable slack management module being used as a direct pass-through distribution module without the storage of extra cable slack.

For example, FIG. 13 illustrates the cable management module 10 set up to output the cabled fibers 16 directly from the module 10 without storing any extra slack 16. Fibers 16 are input via the fan-out 20 and are output via an opening 78 at a front side of the base 22 that is at the same plane 76 as the fan-out 20.

Figure 14:
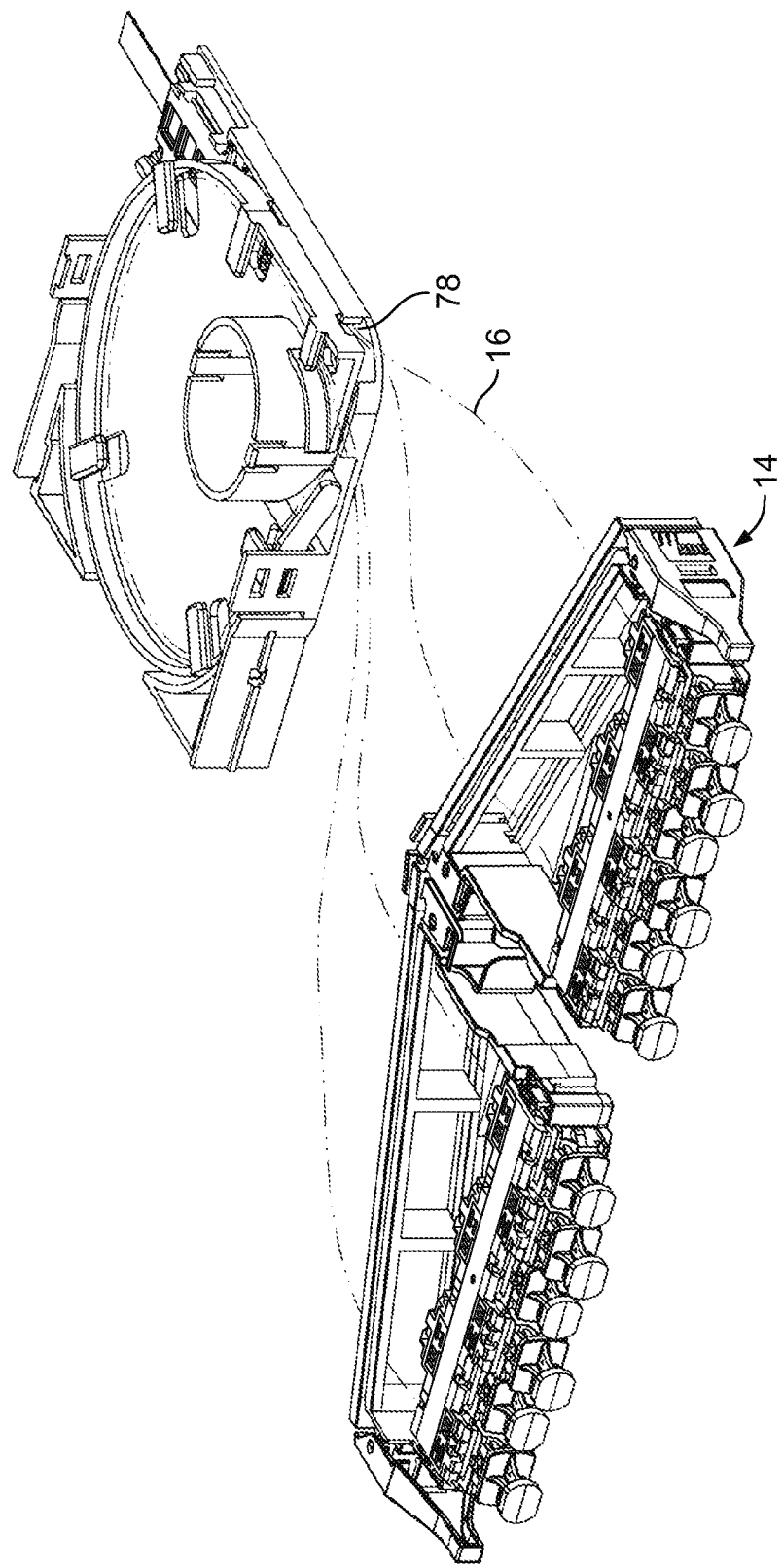
FIG. 14 illustrates the cable slack management module with only one of the trays of the module being used to store extra cable slack.

FIG. 14 illustrates a set-up where only one of the trays 34 (e.g., the lower tray 34a) is used for storing cable slack 16. As shown in the depicted example, one of the sliding adapter modules 14 receives connectorized cables 16 that account for slack and the other of the sliding adapter modules 14 receives connectorized cables 16 directly from the module 10 without any cable slack.

Figure 15:
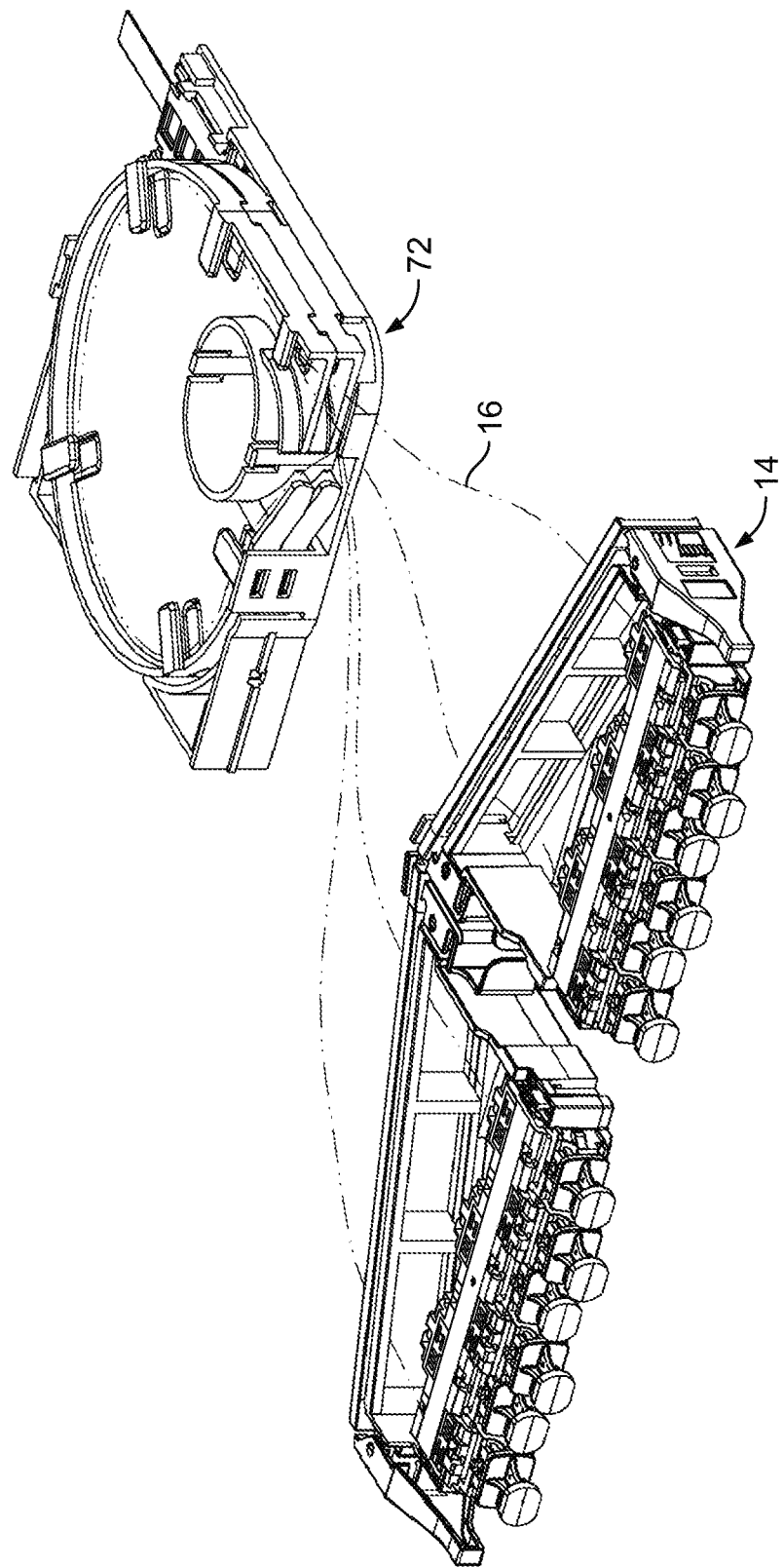
FIG. 15 illustrates the cable slack management module with both of the trays of the module being used to store extra cable slack.

FIG. 15 illustrates the version of the cable slack management module 10 discussed previously, where both of the trays 34 are being used for storing/managing cable slack 16, where one of the sliding adapter modules 14 receives connectorized cables 16 output from the lower tray 34a at a first level and the other sliding adapter module 14 receives connectorized cables 16 output from the upper tray 34b at a second level, wherein both of the levels are above the input plane 76 defined by the fan-out 20.

Figure 16:
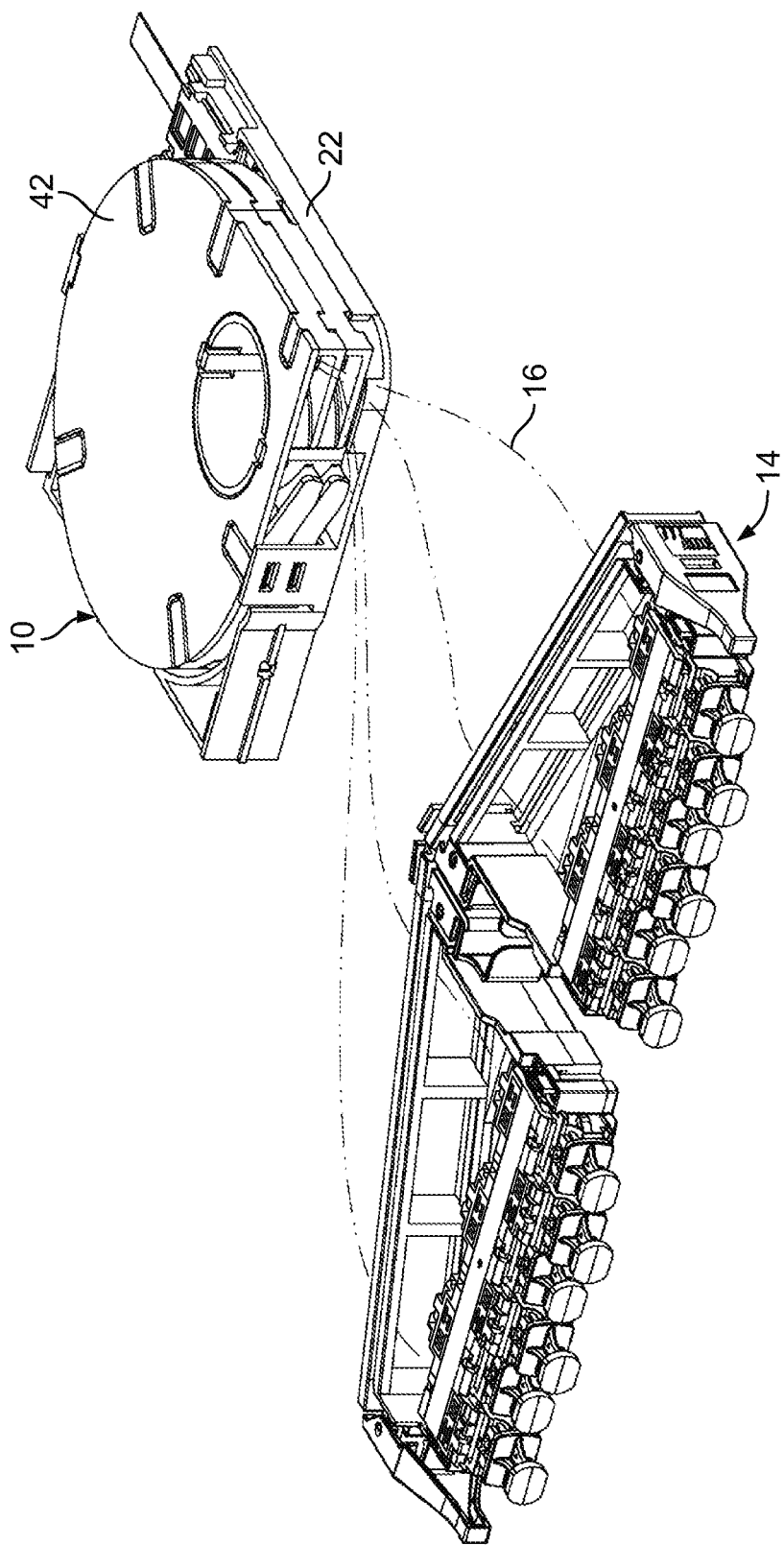
FIG. 16 illustrates the cable slack management module of FIG. 15 in a fully assembled configuration with the upper cover mounted thereon, wherein the output fibers are shown as being directed to sliding adapter modules.
Figure 17:
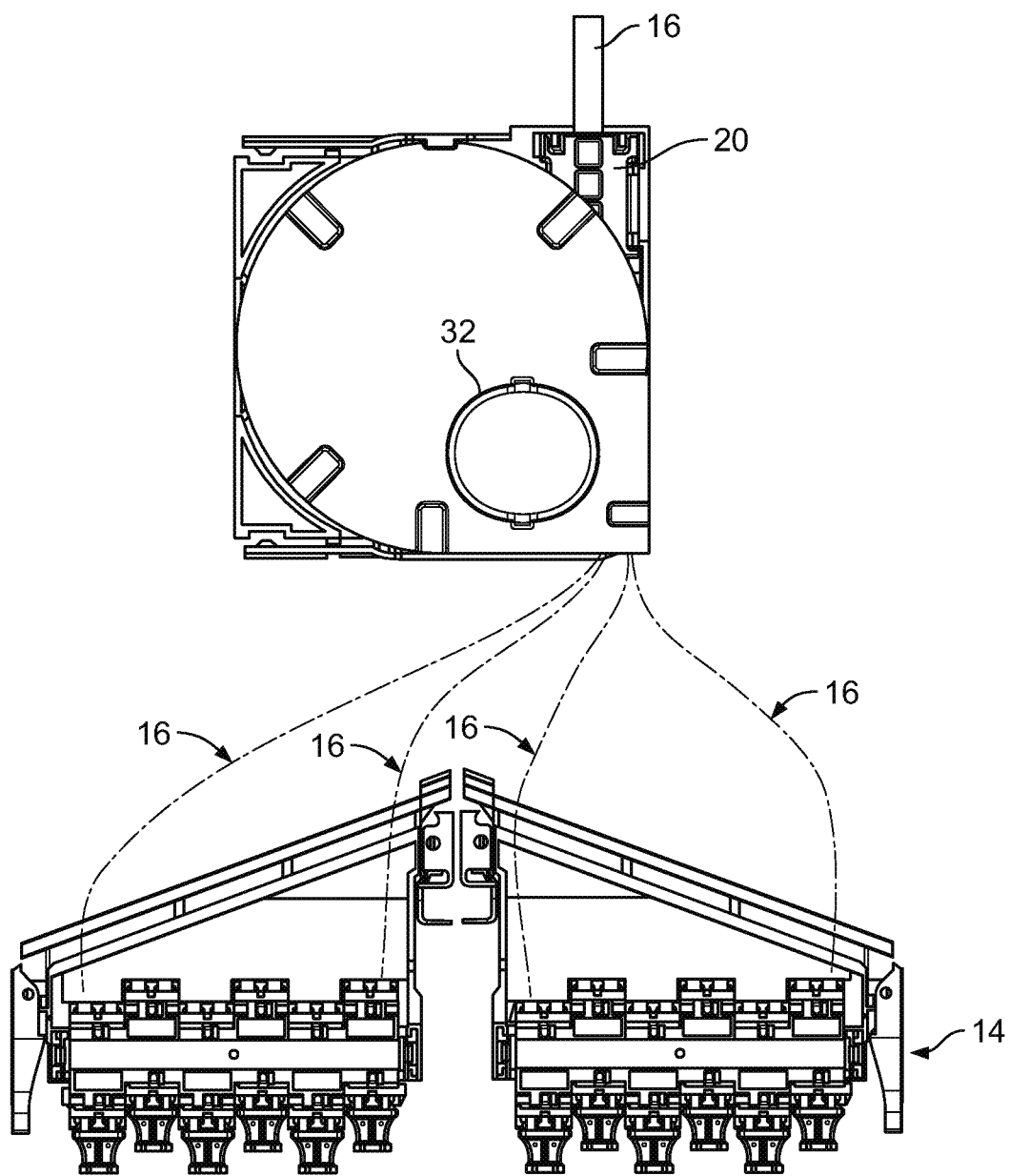
FIG. 17 illustrates the cable slack management module of FIG. 16 from a top view.

FIGS. 16-17 illustrate the module set-up of FIG. 15 with the upper cover 42 applied.

In the depicted embodiment, the cable slack management module 10 is designed to manage twenty-four 900 μm fibers that are input into the module 10 through a twenty-four fiber fan-out 20. As illustrated, the twenty-four fibers may be split into two groups of twelve fibers before exiting the module 10, wherein each group of twelve fibers may be lead to oppositely moving sliding adapter modules 14 (as shown in FIGS. 13-17) or adjacent stacked adapter modules 14 that move in the same direction. The cable slack management module 10 provides multiple set-up options.

The chassis 12 depicted in FIGS. 1-4 is a 288-fiber chassis, with twenty-four sliding adapter modules 14 (i.e., two sets of twelve oppositely moving adapter modules 14), each adapter module 14 including twelve adapter ports. The fiber counts can be varied depending upon the desired density at both the input side (different fan-out devices) or at the output side.

Although in the foregoing description, terms such as "top," "bottom," "front," "back," "right," "left," "upper," and "lower" may have been used for ease of description and illustration, no restriction is intended by such use of the terms. The devices described herein can be used in any orientation, depending upon the desired application.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

The invention claimed is:

1. A fiber optic cable slack management module comprising:
   a base defining a first cable management spool, an outer face of which is configured to contact cables when cables are pulled away from the base;
   a second cable management spool, within which the first cable management spool is located, wherein an inner face of the second cable management spool is configured to contact cables when cables are in a relaxed, non-pulled state, wherein the fiber optic cable slack management module defines a cable exit; and
   at least one tray removably mounted to the base, the at least one tray configured for managing cables, wherein an outer peripheral wall of the at least one tray defines the second cable management spool, a cable entrance point for the at least one tray being adjacent the cable exit, wherein the first and second cable management spools are configured such that the cables are looped once around the at least one tray and the first cable management spool does not contact the cables when the cables are in the relaxed, non-pulled state and contacts the cables when the cables are pulled away from the base.

2. A fiber optic cable slack management module according to claim 1, further comprising a plurality of removable trays mounted to the base in a stacked configuration, each of the trays configured for managing cables, wherein an outer peripheral wall of each tray defines the second cable management spool, wherein fibers entering the base along a common plane are directed to multiple different levels provided by the trays via ramps defined by the trays.

3. A fiber optic cable slack management module according to claim 2, wherein the plurality of trays comprises two trays.

4. A fiber optic cable slack management module according to claim 1, wherein an input for the cable slack management module is defined by a fiber optic fan-out.

5. A fiber optic cable slack management module according to claim 4, wherein the input is defined at a rear of the base and the cable exit is defined at a front of the base, wherein the input and the cable exit are generally aligned when viewed in a front to back direction.

6. A fiber optic cable slack management module according to claim 2, wherein each tray defines a smooth, flush ceiling so as to allow unobstructed movement of the cables between the relaxed, non-pulled state and a pulled state.

7. A fiber optic cable slack management module according to claim 6, wherein each tray defines cable retention fingers extending inwardly from the outer peripheral wall, the retention fingers fitting within notches defined by a cover for each tray so as to define the smooth, flush ceiling.

8. A fiber optic cable slack management module according to claim 7, wherein the cover for at least one of the trays is defined by a floor of an adjacent upper tray.

9. A fiber optic cable slack management module according to claim 1, further comprising snap-fit features for removably mounting to a telecommunications fixture.

10. A fiber optic telecommunications system comprising:
    a telecommunications chassis including a plurality of fiber optic adapters mounted to the chassis;

at least one cable slack management module mounted to the chassis, the cable slack management module configured to manage cables extending from fiber optic connectors coupled to the plurality of fiber optic adapters, the at least one cable slack management module comprising:
- a base defining a first cable management spool, an outer face of which is configured to contact cables when cables are pulled away from the base;
- a second cable management spool, within which the first cable management spool is located, wherein an inner face of the second cable management spool is configured to contact cables when cables are in a relaxed, non-pulled state, wherein the fiber optic cable slack management module defines a cable exit; and
- at least one tray removably mounted to the base, the at least one tray configured for managing cables, wherein an outer peripheral wall of the at least one tray defines the second cable management spool, a cable entrance point for the at least one tray being adjacent the cable exit, wherein the first and second cable management spools are configured such that the cables are looped once around the at least one tray and the first cable management spool does not contact the cables when the cables are in the relaxed, non-pulled state and contacts the cables when the cables are pulled away from the base.

11. A fiber optic telecommunications system according to claim 10, further comprising a plurality of the cable slack management modules mounted to the chassis in a stacked arrangement.

12. A fiber optic telecommunications system according to claim 10, wherein the plurality of fiber optic adapters includes LC format fiber optic adapters.

13. A fiber optic telecommunications system according to claim 10, wherein an input for the at least one cable slack management module is defined by a fiber optic fan-out that separates ribbonized fibers into individual cabled fibers leading to the fiber optic connectors coupled to the plurality of fiber optic adapters.

14. A fiber optic telecommunications system according to claim 10, further comprising a plurality of removable trays mounted to the base in a stacked configuration, each of the trays configured for managing cables, wherein an outer peripheral wall of each tray defines the second cable management spool, wherein fibers entering the base along a common plane are directed to multiple different levels provided by the trays via ramps defined by the trays.

15. A fiber optic telecommunications system according claim 11, wherein each cable slack management module includes two of the trays.

16. A fiber optic telecommunications system according to claim 14, wherein each tray defines a smooth, flush ceiling so as to allow unobstructed movement of the cables between the relaxed, non-pulled state and a pulled state.

17. A fiber optic telecommunications system according to claim 16, wherein each tray defines cable retention fingers extending inwardly from the outer peripheral wall, the retention fingers fitting within notches defined by a cover for each tray so as to define the smooth, flush ceiling.

* * * * *